(12) United States Patent
Wang et al.

(10) Patent No.: US 8,203,615 B2
(45) Date of Patent: Jun. 19, 2012

(54) IMAGE DEBLURRING USING PANCHROMATIC PIXELS

(75) Inventors: Sen Wang, Rochester, NY (US); Hou Tingbo, Stony Brook, NY (US); Rodney L. Miller, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 357 days.

(21) Appl. No.: 12/580,591

(22) Filed: Oct. 16, 2009

(65) Prior Publication Data

US 2011/0090378 A1   Apr. 21, 2011

(51) Int. Cl.
G06K 9/40 (2006.01)
H04N 5/228 (2006.01)

(52) U.S. Cl. .................................. 348/208.4; 382/255
(58) Field of Classification Search .................. 382/255; 348/208.99, 208.1, 208.4, 208.6, 208.12
See application file for complete search history.

(56) References Cited

U.S. PATENT DOCUMENTS

| | | | |
|---|---|---|---|
| 3,971,065 A | 7/1976 | Bayer | |
| 4,876,591 A | 10/1989 | Muramatsu | |
| 6,011,875 A | 1/2000 | Laben et al. | |
| 6,097,835 A | 8/2000 | Lindgren | |
| 7,239,342 B2 | 7/2007 | Kingetsu et al. | |
| 7,340,099 B2 | 3/2008 | Zhang | |
| 7,683,950 B2 * | 3/2010 | Kelly et al. | 348/252 |
| 2004/0081364 A1 * | 4/2004 | Murphy | 382/260 |
| 2006/0017837 A1 | 1/2006 | Sorek et al. | |
| 2006/0181620 A1 * | 8/2006 | Kimbell | 348/241 |
| 2006/0187308 A1 | 8/2006 | Lim et al. | |
| 2007/0046807 A1 | 3/2007 | Hamilton, Jr. et al. | |
| 2007/0223831 A1 | 9/2007 | Mei et al. | |
| 2008/0240607 A1 | 10/2008 | Sun et al. | |
| 2009/0179995 A1 | 7/2009 | Fukumoto et al. | |
| 2010/0053349 A1 * | 3/2010 | Watanabe et al. | 348/222.1 |

(Continued)

FOREIGN PATENT DOCUMENTS

WO   WO 2008/106282 A1   9/2008

OTHER PUBLICATIONS

Marius Tico et al.: "Image Stabilization Based on Fusing the Visual Information in Differently Exposed Images", Proceedings 2007 IEEE International Conference on Image Processing, ICIP 2007, Feb. 1, 2007, pp. 117-120, XP002609057, IEEE Piscataway, NJ, USA, ISBN: 978-1-4244-1436-9, Sections 1-2, p. 3.

(Continued)

*Primary Examiner* — Timothy J Henn
(74) *Attorney, Agent, or Firm* — Kevin E. Spaulding

(57) ABSTRACT

A method for determining a deblurred image from images captured using an image sensor comprising a two-dimensional array of light-sensitive pixels including panchromatic pixels and color pixels, the method comprising: receiving image sensor data from the image sensor for a sharp image of a scene captured with a short exposure time; receiving image sensor data from the image sensor for a blurred image of the scene captured with a longer exposure time than the sharp image; determining an interpolated sharp grayscale image from the sharp image; determining an interpolated blurred color image from the blurred image; determining an interpolated blurred grayscale image from the blurred image; determining a blur kernel responsive to the sharp grayscale image and the blurred grayscale image; determining a deblurred image responsive to the blurred color image and the blur kernel; and storing the deblurred image in a processor-accessible memory system.

24 Claims, 11 Drawing Sheets

U.S. PATENT DOCUMENTS

2011/0050919 A1* 3/2011 Albu et al. .................. 348/208.6

OTHER PUBLICATIONS

Marius Tico et al.: "Motion Blur Identification Based on Differently Exposed Images", 2006 International Conference on Image Processing, Oct. 11, 1996, pp. 2021-2024, XP002609058, IEEE Piscataway, NJ, USA, ISBN: 1-4244-0481-9, Section 2, Abstract.

W. H. Richardson, "Bayesian-based iterative method of image restoration," Journal of the Optical Society of America, vol. 62, , pp. 55-59, 1972.

L. B. Lucy, "An iterative technique for the rectification of observed distributions," Astronomical Journal, vol. 79, pp. 745-754, 1974.

Donatelli et al., "Improved image deblurring with anti-reflective boundary conditions and re-blurring," Inverse Problems, vol. 22, pp. 2035-2053, 2006.

Yuan, et al., "Progressive inter-scale and intra-scale non-blind image deconvolution," ACM Transactions on Graphics, vol. 27, Iss. 3, 2008.

Fergus et al., "Removing camera shake from a single photograph," ACM Transactions on Graphics, vol. 25, pp. 787-794, 2006.

Shan et al., "High-quality motion deblurring from a single image," ACM Transactions on Graphics, vol. 27, pp. 1-10, 2008.

Levin, et al., "Understanding and evaluating blind deconvolution algorithms," Proc. IEEE Conf. on Computer Vision and Pattern Recognition, 2009.

Rav-Acha, et al., "Two motion-blurred images are better than one," Pattern Recognition Letters, vol. 36, pp. 211-217, 2005.

Liu, et al., "Simultaneous image formation and motion blur restoration via multiple capture," Proc. International Conference Acoustics, Speech, Signal Processing, pp. 1841-1844, 2001.

Ben-Ezra, et al., "Motion deblurring using hybrid imaging," Proc. IEEE Conf. on Computer Vision and Pattern Recognition, vol. 1, pp. 657-664, 2003.

Rasker, et al., "Coded exposure photography: motion deblurring using fluttered shutter," ACM Transactions on Graphics, vol. 25, pp. 795-804, 2006.

Yuan et al., "Image deblurring with blurred/noisy image pairs," ACM Transactions on Graphics, vol. 26, Iss. 3, 2007.

Levin et al., "Image and depth from a conventional camera with a coded aperture," ACM Transactions on Graphics, vol. 26, Issue 6, 2007.

* cited by examiner

IMAGE DEBLURRING USING PANCHROMATIC PIXELS

CROSS-REFERENCE TO RELATED APPLICATIONS

Reference is made to, co-pending U.S. Patent Application Publication No. 2010/0232692, published Sep. 16, 2010, entitled: "CFA image with synthetic panchromatic image", by Kumar, et al.; to U.S. Pat. No. 8,068,153, issued Nov. 29, 2011, entitled "Producing full-color image using CFA data" by Kumar et al.; to U.S. Pat. No. 8,045,024, issued Oct. 25, 2011, entitled "Producing full-color image with reduced motion blur" by Kumar et al.; to co-pending U.S. Patent Application Publication No. 2010/0302423, published Dec. 2, 2010, entitled "Four-channel color filter array pattern" by James E. Adams Jr., et al.; to co-pending U.S. Patent Application Publication No 2010/0302418, published Dec. 2, 2010, entitled "Four-channel color filter array interpolation" by James E. Adams Jr., et al. .; and to commonly assigned, co-pending U.S. Patent Application Publication 2011/0090352, published Apr. 21, 2011, entitled: "Image deblurring using a spatial image prior", by Sen, et al., the disclosures of which are incorporated herein by reference.

FIELD OF THE INVENTION

This invention pertains to the field of image deblurring and more particularly to a method for determining a deblurred image from images captured using an image sensor having panchromatic pixels and color pixels.

BACKGROUND OF THE INVENTION

One common source of image blur in digital imaging is the relative motion between a camera and a scene during the exposure time (integration time) associated with image capture. This type of image blur is sometimes called "motion blur" or "smear." Motion blur typically occurs when the light level in the image capture environment is dim, thus necessitating a long exposure time.

One approach to reduce motion blur is to use an electronic flash to supplement the natural illumination. However, this is only effective when the subject is relatively close to the camera. Additionally, many users find that flash photography provides a less satisfactory experience.

Another approach to reducing the problem of motion blur is to improve the light sensitivity of electronic image sensors in order to reduce the exposure time during image capture. While much progress has been made in this area in recent years, the light sensitivity of currently available electronic image sensors is not high enough to prevent motion blur in many image capture environments.

One factor that reduces the light sensitivity of electronic image sensors is the use of color filters placed over the sensors to enable the formation of color images. For example, the well-known "Bayer pattern" taught in U.S. Pat. No. 3,971,065 to Bayer, teaches the use of a repeating array of red, green and blue color filters to detect color image signals. While this general approach is used today in most consumer digital cameras, the color filter array (CFA) has the undesirable effect of throwing away about ⅔ of the incident light, and therefore substantially reduces the photographic speed of the imaging system.

U.S. Pat. No. 4,876,591 to Muramatsu discloses an electronic imaging system that includes a beam-splitter and two different sensors, wherein one sensor has no color filters and the other sensor includes a pattern of color filters. The sensor without the color filters provides for increased light sensitivity, while the other sensor provides color information. Although this system improves the light sensitivity over a single conventional image sensor, the overall complexity, size, and cost of the system is greater due to the need for two sensors and a beam splitter. Furthermore, the beam splitter directs only half the light from the image to each sensor, limiting the improvement in photographic speed.

U.S. Patent Application Publication No. 2007/0046807 to Hamilton, et al., teaches a digital image system using a single sensor having some color image pixels with color filters and some panchromatic image pixels having no color filters. An interpolation algorithm is used to reconstruct a full-color image where the higher speed panchromatic image pixels provide the image detail information. While this approach can reduce motion blur to some extent by enabling shorter exposure times, there will still be some level of motion blur in many low-light imaging scenarios.

Another method to reduce the affect of motion blur in digital images is to use an image enhancement algorithm to compensate for blur in the captured image. Such algorithms are often referred to as "deblurring" or "deconvolution" algorithms. Such algorithms can be roughly classified into two categories: "blind" and "non-blind". If a blur kernel associated with the image blur is not known, then the problem is said to be "blind deconvolution," whereas when the blur kernel is known, it is said to be "non-blind deconvolution."

For non-blind deconvolution, the most common technique is Richardson-Lucy (RL) deconvolution. (See the articles: W. H. Richardson, "Bayesian-based iterative method of image restoration," Journal of the Optical Society of America, Vol. 62, pp. 55-59, 1972, and L. B. Lucy, "An iterative technique for the rectification of observed distributions," Astronomical Journal, vol. 79, pp. 745-754, 1974.) This method involves the determination of a deblurred image (sometimes referred to as a "latent image") under the assumption that its pixel intensities conform to a Poisson distribution.

In the article "Improved image deblurring with anti-reflective boundary conditions and re-blurring" (Inverse Problems, Vol. 22, pp. 2035-2053, 2006), Donatelli et al. use a Partial Differential Equation (PDE)-based model to recover a deblurred image with reduced ringing by incorporating an anti-reflective boundary condition and a re-blurring step.

In the article "Progressive inter-scale and intra-scale non-blind image deconvolution" (ACM Transactions on Graphics, Vol. 27, Iss. 3, 2008), Yuan, et al. disclose a progressive inter-scale and intra-scale non-blind image deconvolution approach that significantly reduces ringing.

Blind deconvolution is an ill-posed problem, which is significantly more challenging. Approaches to pure blind deconvolution apply to either single blurred image or multiple blurred images. The most challenging problem is single-image blind deblurring, which requires the simultaneous estimation of the deblurred image and the Point Spread Function (PSF) associated with the image blur.

In the article "Removing camera shake from a single photograph" (ACM Transactions on Graphics, Vol. 25, pp. 787-794, 2006), Fergus et al. show that blur kernels are often complex and sharp. They teach an ensemble learning approach to recover a blur kernel, while assuming a certain statistical distribution for natural image gradients.

In the article "High-quality motion deblurring from a single image" (ACM Transactions on Graphics, Vol. 27, pp. 1-10, 2008), Shan et al. disclose a method for removing motion blur using a unified probabilistic model of both blur kernel estimation and unblurred image restoration.

In the article "Understanding and evaluating blind deconvolution algorithms" (Proc. IEEE Conf. on Computer Vision and Pattern Recognition, 2009), Levin, et al. described and evaluated a number of single-image blind deconvolution algorithms.

Having multiple blurred images can provide additional constraints to improve the deblurring process. In the article "Two motion-blurred images are better than one" (Pattern Recognition Letters, Vol. 36, pp. 211-217, 2005), Ray-Acha, et al. teach the use of images with different blurring directions to provide improved kernel estimation.

Recently, another type of blind deconvolution has been disclosed that employs additional information besides the blurred image to improve the deconvolution. This method can be categorized as "quasi-blind deconvolution." In the article "Simultaneous image formation and motion blur restoration via multiple capture" (Proc. International Conference Acoustics, Speech, Signal Processing, pp. 1841-1844, 2001), Liu, et al. teach using a CMOS sensor to capture multiple high-speed frames within a normal exposure time. Image pixels having motion blur are replaced with the pixels from one of the high-speed frames.

In the article "Motion deblurring using hybrid imaging" (Proc.

IEEE Conf on Computer Vision and Pattern Recognition, Vol. 1, pp. 657-664, 2003), Ben-Ezra, et al. disclose a hybrid camera that simultaneously captures a high-resolution image together with a sequence of low-resolution images that are temporally synchronized. With this method, optical flow is derived from the low-resolution images to estimate the global motion blur of the high-resolution image.

In the article "Coded exposure photography: motion deblurring using fluttered shutter" (ACM Transactions on Graphics, Vol. 25, pp. 795-804, 2006), Rasker, et al. disclose a "fluttered shutter" camera, which opens and closes the shutter during a normal exposure time with a pseudo-random sequence. The flutter changes the normal "box filter" to a broad-band filter that preserves high-frequency spatial details in the blurred image. As a result, the corresponding deconvolution becomes a well-posed problem.

In the paper "Image deblurring with blurred/noisy image pairs" (ACM Transactions on Graphics, Vol. 26, Issue 3, 2007), Yuan et al. have disclosed a method of image deblurring using blurred and noisy image pairs. Each image pair contains a blurred image captured with a long exposure time, and a noisy image captured with a short exposure time. The noise associated with the short exposure time image can be severe under low light condition, and therefore the deblurring results are highly depend on the performance of a denoising operation.

In the article "Image and depth from a conventional camera with a coded aperture" (ACM Transactions on Graphics, Vol. 26, Issue 6, 2007), Levin et al. employ a coded to obtain an approximate blur kernel which can be used in a deblurring algorithm. This deblurring approach is limited to image blur caused by defocus.

Another method to reduce blur and capture images in low-light scenarios, known in the fields of astrophotography and remote sensing, is to capture two images: a panchromatic image with high spatial resolution and a multi-spectral image with low spatial resolution. The images are fused to generate a multi-spectral image with high spatial resolution. Such approaches are described in U.S. Pat. Nos. 7,340,099, 6,011,875 and 6,097,835.

SUMMARY OF THE INVENTION

The present invention represents a method for determining a deblurred image from images captured using an image sensor comprising a two-dimensional array of light-sensitive pixels including panchromatic pixels and color pixels, the pixels being arranged in a rectangular minimal repeating unit, the method implemented at least in part by a data processing system and comprising:

a) receiving image sensor data from the image sensor for a sharp image of a scene captured with a short exposure time;

b) receiving image sensor data from the image sensor for a blurred image of the scene captured with a longer exposure time than the sharp image, wherein the blurred image has a higher level of motion blur than the sharp image;

c) determining an interpolated sharp grayscale image from the image sensor data for the sharp image;

d) determining an interpolated blurred color image from the image sensor data for the blurred image;

e) determining an interpolated blurred grayscale image from the image sensor data for the blurred image;

f) determining a blur kernel responsive to the sharp grayscale image and the blurred grayscale image;

g) determining a deblurred image responsive to the blurred color image and the blur kernel; and h) storing the deblurred image in a processor-accessible memory system.

This invention has the advantage that it produces deblurred images having a lower noise level than the sharp image, but having a higher sharpness level than the blurred image.

It has the additional advantage that it produces deblurred images having fewer ringing artifacts than prior art deblurring algorithms.

It has the further advantage that the sharp grayscale image will have a lower noise level than an image captured with the same exposure time using a conventional RGB image sensor due to the higher light sensitivity of the panchromatic pixels.

BRIEF DESCRIPTION OF THE DRAWINGS

FIG. 6 shows a pixel pattern for an image sensor having red, green, blue and panchromatic pixels;

FIG. 7 shows additional pixel patterns for image sensors having color and panchromatic pixels;

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The phrase, "digital image", as used herein, refers to any digital image, such as a digital still image or a digital video image.

Figure 1:
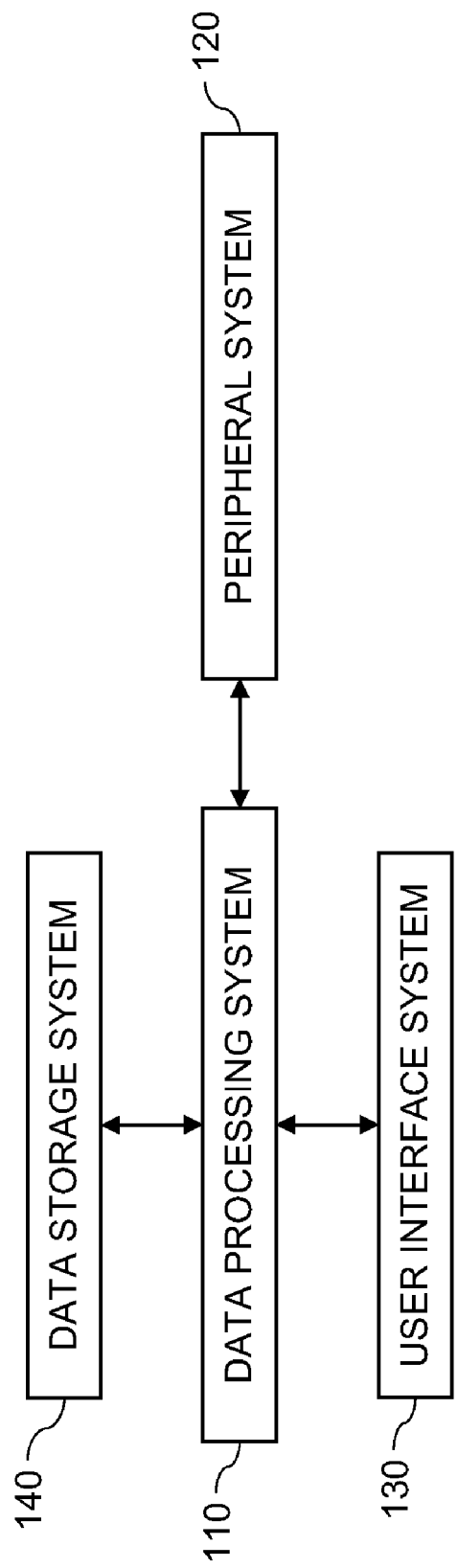
FIG. 1 is a high-level diagram showing the components of a system for classifying digital image according to an embodiment of the present invention.

FIG. 1 is a high-level diagram showing the components of a system for determining a deblurred image according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

The present invention will now be described with reference to FIG. 2. A receive blurred image step 200 is used to receive a blurred image 205, and a receive sharp image step 210 is used to receive a sharp image 215. Next an estimate blur kernel step 220 is used to determine a blur kernel 225 responsive to the blurred image 205 and the sharp image 215. The blur kernel 225 is a convolution kernel that could be applied to the sharp image 215 to produce an image having sharpness characteristics approximately equal to the blurred image 205. Next a compute reference differential images step 230 is used to compute a set of one or more reference differential images 235 from the sharp image 215. The set of reference differential images 235 can include gradient images computed by calculating numerical derivatives in different directions (e.g., x and y) or gradient images computed by calculating numerical derivatives with different pixel intervals (e.g., $\Delta x=1, 2, 3$). Next a compute deblurred image step 245 is used to compute the deblurred image 250 responsive to the blurred image 205, the blur kernel 225 and the reference differential images 235. As will be described in more detail later, in a preferred embodiment of the present invention, the compute deblurred image step 245 employs a Bayesian inference method using Maximum-A-Posterior (MAP) estimation. Finally, a store deblurred image step 255 is used to store the resulting deblurred image 250 in a processor-accessible memory. The processor-accessible memory can be any type of digital storage such as RAM or a hard disk.

Figure 3:
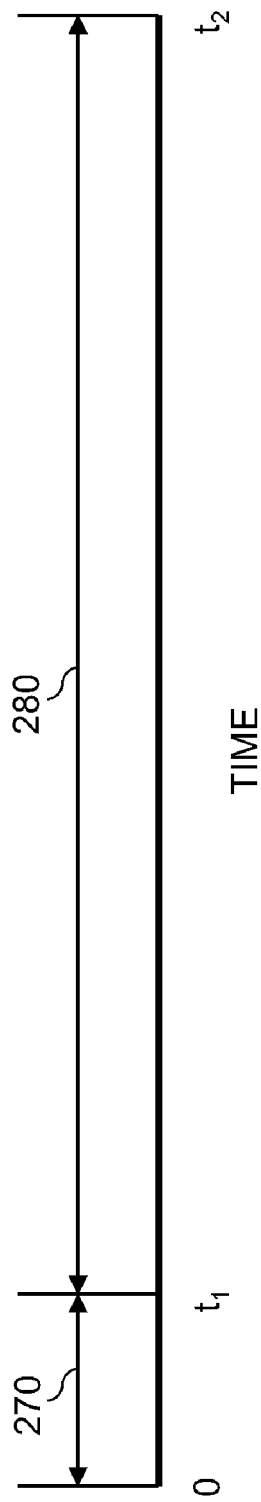
FIG. 3 is a timing diagram for capturing a pair of images with short and long exposure times.

In one embodiment of the present invention, the blurred image 205 and the sharp image 215 are captured using a digital camera using two sequential exposures. The sharp image 215 is captured using a short exposure time to provide an image with a low level of motion blur. However, this image will generally have a high level of image noise, particularly when scenes are photographed having a low level of illumination. The blurred image 205 is captured using a longer exposure time to provide an image with a low level of image noise. However, if there is any relative motion between the camera and objects in the scene during the time of the exposure, the blurred image 205 will have a higher level of motion blur. An example of a timing diagram for capturing a pair of images with short and long exposure times is shown in FIG. 3. A short exposure time 270 (between times t=0 and t=$t_1$) is used to capture the sharp image 215. A second longer exposure time 280 (between times t=$t_1$ and t=$t_2$) is used to capture the blurred image 205. The exposure times can be controlled by adjusting the integration time for a digital sensor, or alternately by controlling a shutter. In a preferred embodiment of the present invention, the two images are captured by the digital camera in response to a single button press.

Figure 4:
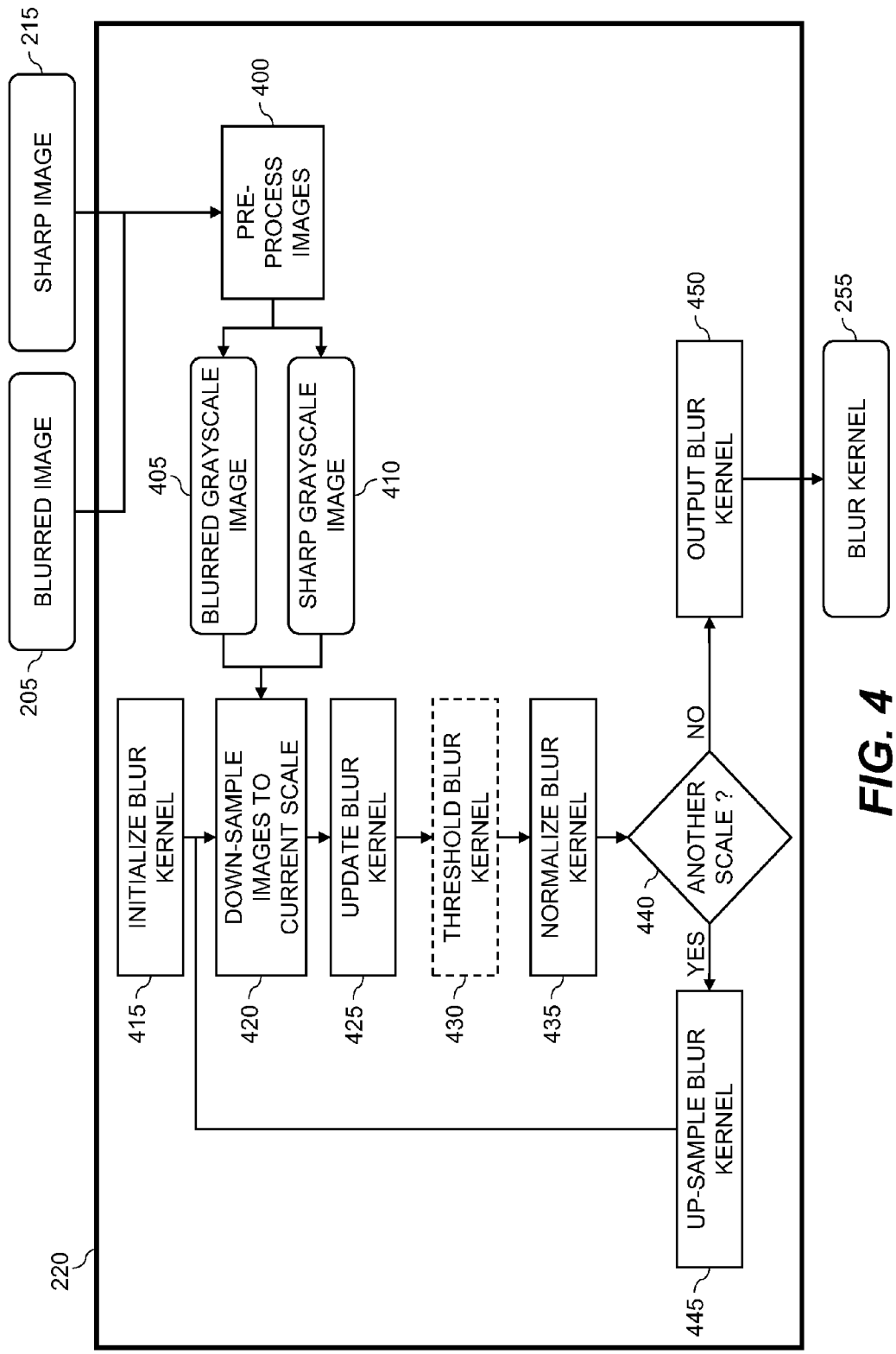
FIG. 4 is a flowchart showing additional details for the estimate blur kernel step in FIG. 2 according to a preferred embodiment of the present invention.

FIG. 4 shows a flow chart giving more details of the estimate blur kernel step 220 according to a preferred embodiment of the present invention. Since the blur kernel will generally be independent of the color channel, it is generally preferable to determine the blur kernel using grayscale versions of the blurred image 205 and the sharp image 215. A pre-process images step 400 is used to compute a blurred grayscale image 405 from the blurred image 205 and to compute a sharp grayscale image 410 from the sharp image 215. The conversion from a color image to a grayscale image can be performed using any method known in the art. In a preferred embodiment of the present invention, the grayscale images are determined by performing a weighted summation of the color channels:

$$P = a_R R + a_G G + a_B B \quad (1)$$

where R, G and B are pixel values for the red, green and blue color channels of the input image, respectively, $a_R$, $a_G$ and $a_B$ are constants, and P is a pixel value of the grayscale image.

The pre-process images step 400 can also perform other functions in addition to converting the images to a grayscale format. For example, the pre-process images step 400 can apply a denoising algorithm to the sharp image 215 to reduce the noise level. There are many denoising algorithms that are well known in the art, such as median filtering algorithms.

The pre-process images step 400 can also apply a tone scale adjustment process to equalize the signal levels for the two images. Histogram equalization is one example of a tone scale adjustment process that is well-known in the art.

The pre-process images step 400 can also be used to apply an affine transform to either the blurred image 205 or the sharp image 215 to better align it with other image. This can be used to account for movement of the camera or the scene between the times that the two images were captured.

The pre-process images step 400 can also be used to crop out a subset of the blurred image 205 and a corresponding subset the sharp image 215 to increase the computational efficiency. Preferably, an image region having significant image detail (high deviations of intensity) is selected since that is where the effect of the motion blur will be most significant. Such an image region can be determined by applying a Laplacian operator to the blurred image 205 to form a Laplacian image, and then selecting a region of the Laplacian image having high signal levels. Optionally the Laplacian image can be determined by applying the Laplacian operator to the sharp image 215, or to both the blurred image 205 and the sharp image 215. The selected image region can be a contiguous image region, such as a rectangular region of a particular size, or alternately, the selected image region can comprise a subset of image pixels scattered throughout the image, such as a neighborhoods of image pixels surrounding image pixels in the Laplacian image where the magnitude exceeds a predefined threshold. In an alternate embodiment of the present invention, the image region can be manually user-selected.

In a preferred embodiment of the present invention, the blur kernel 225 is determined with a Bayesian inference method using Maximum-A-Posterior (MAP) estimation. Using this method the blur kernel 225 is determined by defining an energy function of the form:

$$E(K) = (P_B - P_S \otimes K)^2 + \lambda_3 \|K\|_1. \quad (2)$$

where $P_B$ is the blurred grayscale image 405, $P_S$ is the sharp grayscale image 410, K is the blur kernel 225, $\lambda_3$ is a weighting factor, $\otimes$ is a convolution operator, $\|\cdot\|_1$ is 1-norm operator, E(K) is the energy value, which is a function of the blur kernel. It can be seen that this energy function includes a first term that is a function of a difference between the blurred image ($P_B$) and a candidate blurred image determined by convolving the sharp image ($P_S$) with a candidate blur kernel (K).

In the preferred embodiment of the present invention, this MAP problem is solved by the well-known conjugate gradient method to determine the blur kernel that minimizes the energy by solving the partial differential equation (PDE):

$$\frac{\partial E(K)}{\partial K} = 0 \quad (3)$$

For more information on solving PDEs using the conjugate gradient method, please refer to the aforementioned article "Image and depth from a conventional camera with a coded aperture" by Levin et al.

In a preferred embodiment of the present invention, a multi-scale approach is used based on a hierarchy of scaled images to avoid being trapped in local minimum during the optimization. With this multi-scale approach, an iterative process is used that sequentially optimizes an estimate of the blur kernel at a series of scales, starting with a coarse image scale. It has been found that 2 or 3 different scales usually work well, where each scale differs by a factor of 2.

At the coarsest scale, an initialize blur kernel step 415 is used to initialize the blur kernel 225 (K) as a square kernel of a predefined extent having equal elements. A down-sample images step 420 is used to down-sample the blurred grayscale image 405 and the sharp grayscale image 410 to the current scale. For example, if 3 scales are used, the first iteration would require a 4× down-sampling, the second iteration would require a 2× down-sampling, and the third iteration would use the full-resolution images.

Next, an update blur kernel step 425 is used to compute a new estimate of the blur kernel 225 by solving the PDE given in Eq. (3) using the conjugate gradient method, where the blur kernel from the previous iteration is used as the initial guess for the PDE solution. An optional threshold blur kernel step 430 (shown with dashed lines) can be used to threshold small blur kernel elements (e.g. less than 0.1% of total energy) to reduce the noise of estimation. A normalize blur kernel step 435 is used to normalize the estimated blur kernel so that the blur kernel elements sum to 1.0. A test 440 is used to determine whether there are additional scales that need to be processed. If there are additional scales, the current estimate of the blur kernel is up-sampled to the next scale using an up-sample blur kernel step 445. This can be performed using any well-known interpolation technique such as bi-cubic interpolation. When there are no more scales left to process, an output blur kernel step 450 is used to output the final estimate of the blur kernel 225.

In a preferred embodiment of the present invention, the compute deblurred image step 245 uses a Bayesian inference method with Maximum-A-Posterior (MAP) estimation. Using the method, the deblurred image 250 is determined by defining an energy function of the form:

$$E(L) = (L \otimes K - B)^2 + \lambda_1 w |\nabla L|^2 + \lambda_2 \sum_j c_j (\partial_j L - \partial_j S)^2 \quad (4)$$

where L is the deblurred image 250, K is the blur kernel 225, B is the blurred image 205, S is the sharp image 215, j is an index value, $\otimes$ is the convolution operator, $|\cdot|$ is the absolute value operator, $\nabla$ is the gradient operator, $\partial_j$ is a differential operator corresponding to the $j^{th}$ index, w is a pixel-dependent weighting factor, and $\lambda_1$, $\lambda_2$ and $c_j$ are weighting coefficients.

Figure 5:
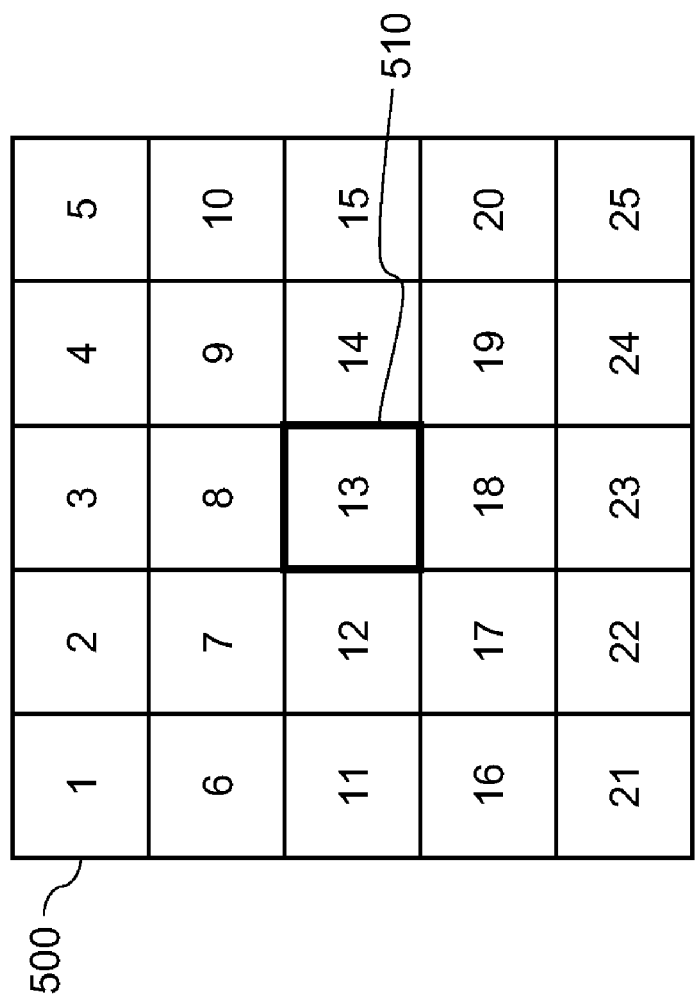
FIG. 5 shows an array of indices that can be used to determine the reference differential images.

The index j is used to identify a neighboring pixel for the purpose of calculating a difference value. In a preferred embodiment of the present invention difference values are calculated for a 5×5 window of pixels centered on a particular pixel. FIG. 5 shows an array of indices 500 centered on a current pixel location 510. The numbers shown in the array of indices 500 are the indices j. For example, an index value of j=6 corresponds top a pixel that is 1 row above and 2 columns to the left of the current pixel location 510.

The differential operator $\partial_j$ determines a difference between the pixel value for the current pixel, and the pixel value located at the relative position specified by the index j. For example, $\partial_6 S$ would correspond to a differential image determined by taking the difference between each pixel in the sharp image S with a corresponding pixel that is 1 row above and 2 columns to the left. In equation form this would be given by:

$$\partial_j S = S(x,y) - S(x - \Delta x_j, y - \Delta y_j) \quad (5)$$

where $\Delta x_j$ and $\Delta y_j$ are the column and row offsets corresponding to the $j^{th}$ index, respectively. The set of differential images $\partial_j S$ can be referred to as reference differential images because they represent an estimate of the desired differential images that should be produced for the deblurred image 250. The compute reference differential images step 230 is used to determine a set of reference differential images 235 using Eq. (5). Generally, it will be desirable for the set of reference differential images 235 to include one or more horizontal differential images representing differences between neighboring pixels in the horizontal direction and one or more vertical differential images representing differences between neighboring pixels in the vertical direction, as well as one or more diagonal differential images representing differences between neighboring pixels in a diagonal direction.

The first term in the energy function given in Eq. (4) is an image fidelity term. In the nomenclature of Bayesian inference, it is often referred to as a "likelihood" term. It can be seen that this term will be small when there is a small difference between the blurred image 205 (B) and a blurred version of the deblurred image (L) which as been convolved with the blur kernel 225 (K).

The second and third terms in the energy function given in Eq. (4) are often referred to as "image priors." The second term will have low energy when the magnitude of the gradient of the deblurred image 250 (L) is small. This reflects the fact that a sharper image will generally have more pixels with low gradient values as the width of blurred edges is decreased. For reasons discussed in the aforementioned article "Image and depth from a conventional camera with a coded aperture" by Levin et al., it is desirable for the pixel-dependent weighting factor w to be determined using the equation:

$$w = |\nabla L|^{\alpha - 2}. \quad (6)$$

where $\alpha$ is a constant (e.g., 0.8). During the optimization process, $\nabla L$ can be calculated for each iteration using the estimate of L determined for the previous iteration. Alternately, the sharp image 215 (S) can be used as an estimate of the deblurred image 250 (L).

The third term in the energy function given in Eq. (4) computes differences between the reference differential images 235 ($\partial_j S$) and differential images computed for the deblurred image ($\partial_j L$). This term can be referred to as an image differential term. Contributions are determined for each of the reference differential images 235, and the contributions are then weighted and summed to determine a single energy term. The energy corresponding to this term will be low when the differential images for the deblurred image ($\partial_j L$) are approximately equal to the reference differential images 235 ($\partial_j S$).

Other researchers have utilized energy function consisting of the first two terms in the energy function shown in Eq. (4). (For example, see the aforementioned article "Image and depth from a conventional camera with a coded aperture" by Levin et al.) The addition of the third term in the energy function containing the reference differential images represents a significant advantage over the energy functions described in the prior art. In particular, it has been found that the use of this term substantially improves the quality of the deblurred image 250 by reducing ringing artifacts that prior art methods are prone to produce near edges in the image.

The compute deblurred image step 245 computes the deblurred image 250 by minimizing the energy function given in Eq. (4) using optimization methods that are well known to those skilled in the art. In a preferred embodiment of the present invention, the optimization problem is formulated as a PDE given by:

$$\frac{\partial E(L)}{\partial L} = 0. \quad (7)$$

which can be solved using conventional PDE solvers. In a preferred embodiment of the present invention, a PDE solver is used where the PDE is converted to a linear equation form that can be solved using a conventional linear equation solver, such as a conjugate gradient algorithm. For more details on solving PDE solvers, refer to the aforementioned article "Image and depth from a conventional camera with a coded aperture" by Levin et al.

It will be understood by one skilled in the art that the compute deblurred image step 245 can use other techniques besides Bayesian inference methods. For example, conventional frequency-domain deconvolution methods can be used where the blurred image 205 is transformed to the frequency domain and divided by a transfer function determined by transforming the blur kernel 225 to the frequency domain. The filtered image can then be transformed back to the spatial domain. Variations of this technique include the well-known Weiner filter.

Digital image capture devices commonly use image sensor with color filter array patterns. For example, the well-known "Bayer pattern" taught in U.S. Pat. No. 3,971,065 to Bayer, teaches the use of a repeating array of red, green and blue color filters to detect color image signals. Recently, a number of researchers have investigated using image sensors with a color filter array having color pixels and panchromatic pixels. For examples, see commonly assigned, co-pending U.S. application Ser. No. 12/412,429 entitled "Producing full-color image using CFA data" by Kumar et al.

Figure 6:
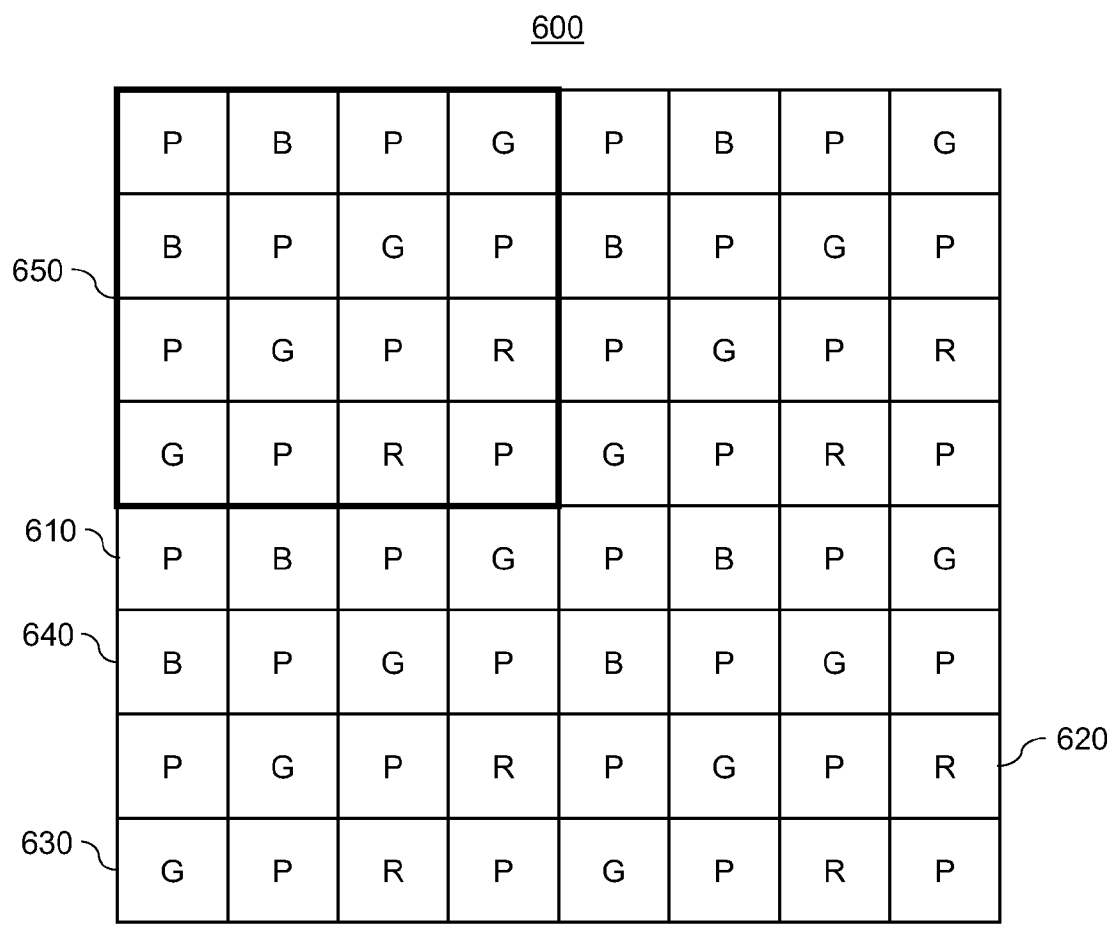

FIG. 6 illustrates a color filter array pattern 600 taught by Kumar et al. The pattern comprises a two-dimensional array of light sensitive pixels having a minimal repeating unit 650. The color filter array pattern 600 has a repeating pattern of panchromatic pixels 610, red pixels 620, green pixels 630 and blue pixels 640. The minimal repeating unit 650 is tiled across the image sensor in a repeating pattern to produce the color filter array pattern 600.

Figure 7:
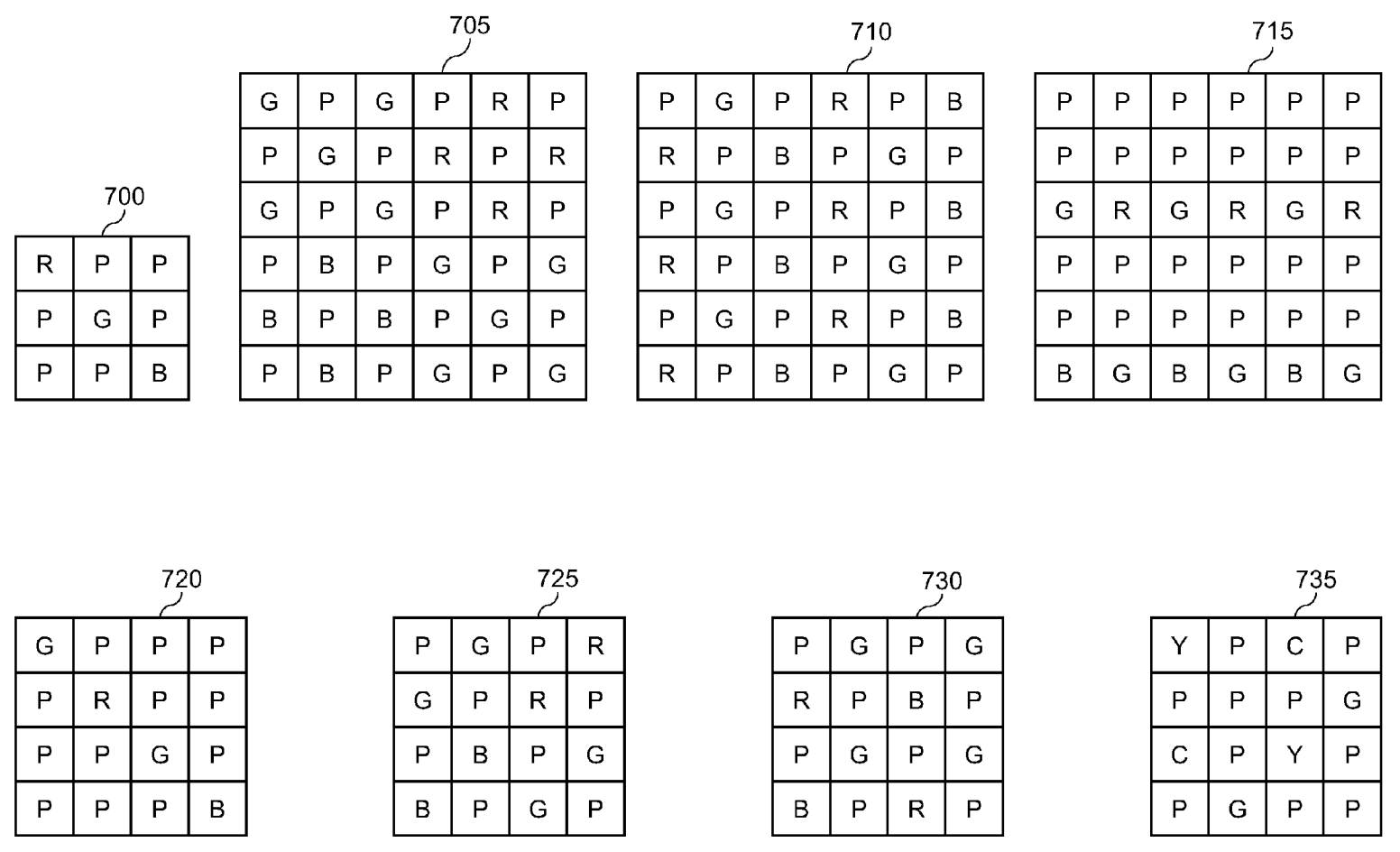

FIG. 7 illustrates minimal repeating units for a number of alternate color filter array patterns that include color pixels and panchromatic pixels. Color filter array patterns 700, 705, 710, 715, 720, 725 and 730 all have panchromatic pixels together with red, green, and blue color pixels arranged in a variety of patterns. Color filter array pattern 735 has panchromatic pixels together with cyan, green and yellow color pixels. It will be obvious to one skilled in the art that these and other color filter array patterns having panchromatic pixels and color pixels can also be used in accordance with the present invention.

Figure 8:
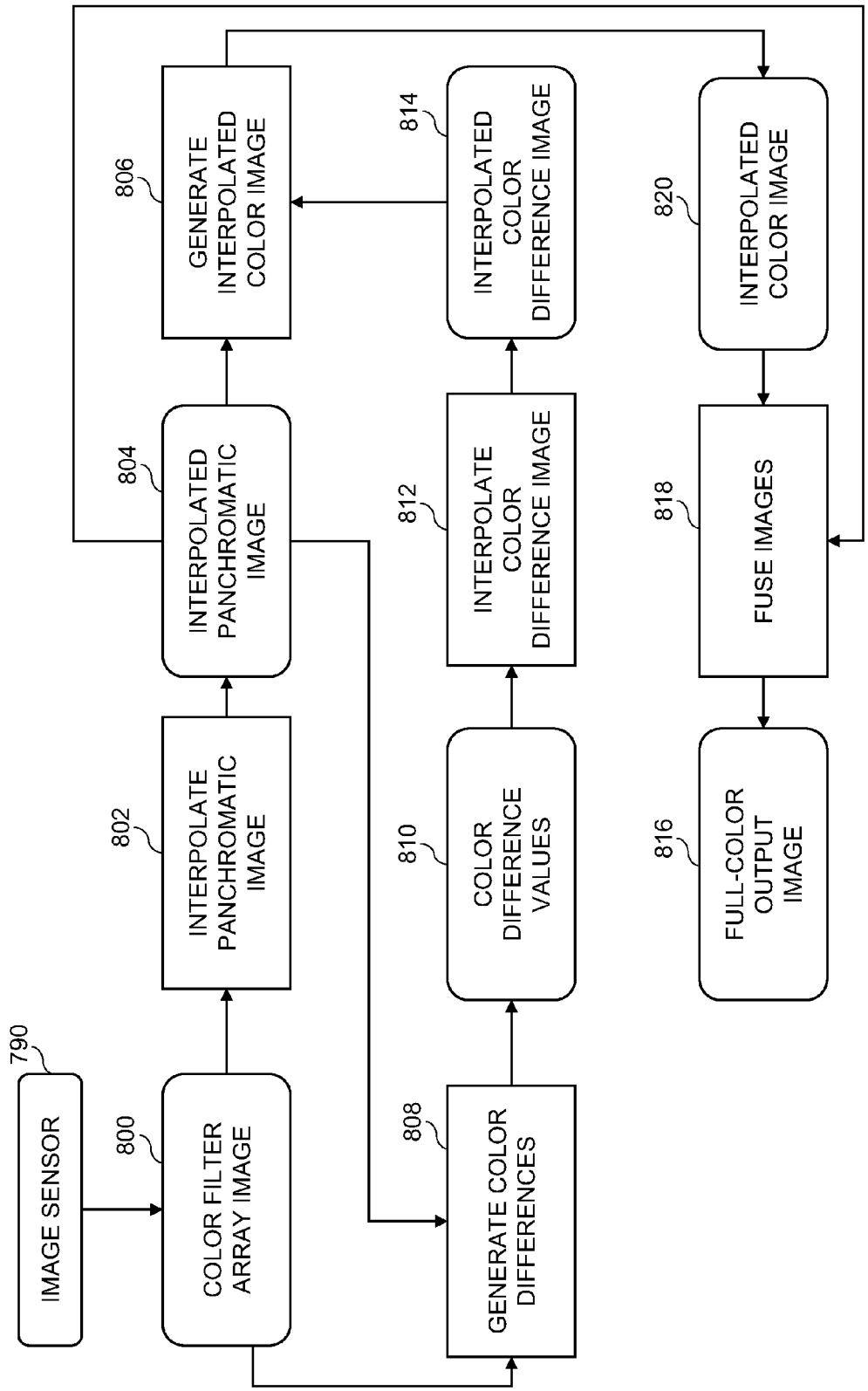
FIG. 8 is a flowchart for a method for forming a color image from an image captured with an image sensor having color and panchromatic pixels.

FIG. 8 shows a flowchart for a method that can be used to form a full color output image from a color filter array image captured with an image sensor 790 having color pixels and panchromatic pixels. The image sensor 790 produces a color filter array image 800. In the color filter array image 800 each pixel location is either a color pixel (e.g., red, green or blue) or a panchromatic pixel as determined by the minimum repeating unit for the image sensor 790, such as those shown in FIG. 6 and FIG. 7. An interpolate panchromatic image block 802 produces an interpolated panchromatic image 804 from the color filter array image 800. A generate color differences block 808 produces color difference values 810 from the color filter array image 800 and the interpolated panchromatic image 804. An interpolate color difference image block 812 produces an interpolated color difference image 814 from the color difference values 810. A generate interpolated color image block 806 produces an interpolated color image 820 from the interpolated panchromatic image 804 and the interpolated color difference image 814. Finally, a fuse images block 818 produces a full-color output image 816 from the interpolated panchromatic image 804 and the interpolated color image 820. More details about each of these steps can be found in the commonly assigned, co-pending U.S. patent application Ser. No. 12/473,305 entitled "Four-channel color filter array interpolation," which is incorporated herein by reference.

Figure 2:
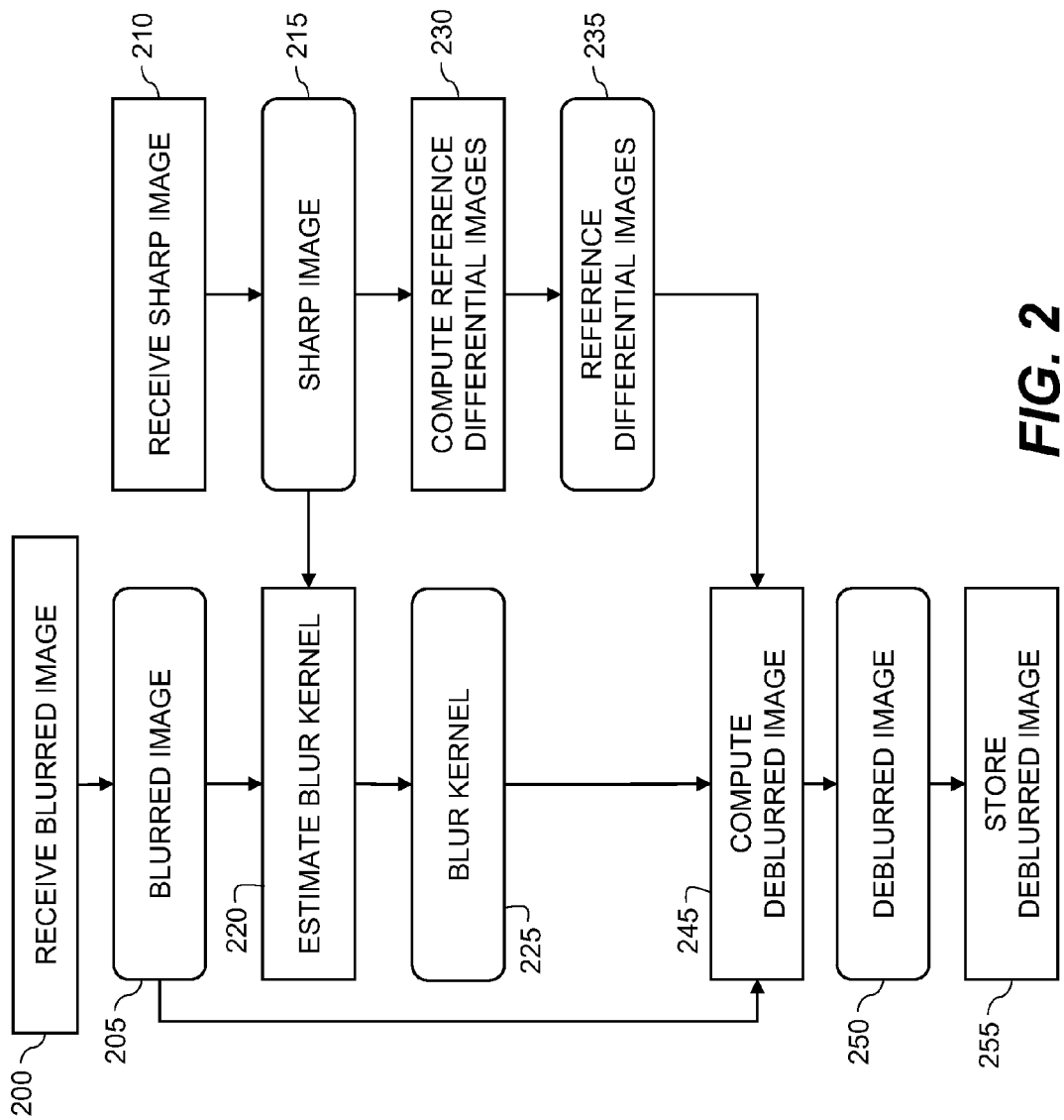
FIG. 2 is a flowchart for a preferred embodiment of the present invention.

In a preferred embodiment of the present invention, image sensors having color pixels and panchromatic pixels are used to capture blurred image 205 and the sharp image 215 in the method of FIG. 2. The blurred image 205 and the sharp image 215 can be captured using one exposure having a short exposure time 270 and another exposure having a longer exposure time 280 as was discussed earlier with reference to FIG. 3. In this case, the method of FIG. 8 can be applied to the two images to form the blurred image 205 and the sharp image 215. Then the method shown in FIG. 2 can be applied to form the deblurred image 250.

Figure 9:
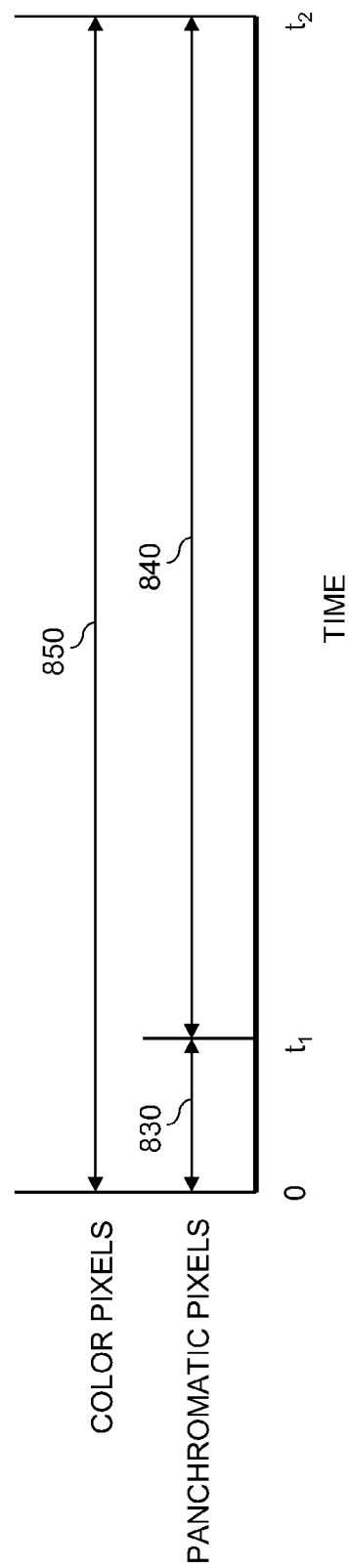
FIG. 9 is a timing diagram for capturing images with short and long exposure times using an image sensor having color and panchromatic pixels.

A timing diagram for an alternate embodiment of the present invention is shown in FIG. 9. At time t=0, an exposure is initiated. At time t=$t_1$, a sharp panchromatic image is read out of the image sensor having a short panchromatic pixel exposure time 830. The panchromatic pixels are then reset and a blurred panchromatic image is read out of the image sensor at time t=$t_2$. The blurred panchromatic image has a longer panchromatic pixel exposure time 840. The color pixels are integrated for the entire time between t=0 and t=$t_2$, giving a color pixel exposure time 850. The panchromatic pixels of the blurred panchromatic image can be combined with the color pixels from the color image to form a blurred image that can be used with the method of FIG. 2, together with the sharp panchromatic image.

Figure 10:
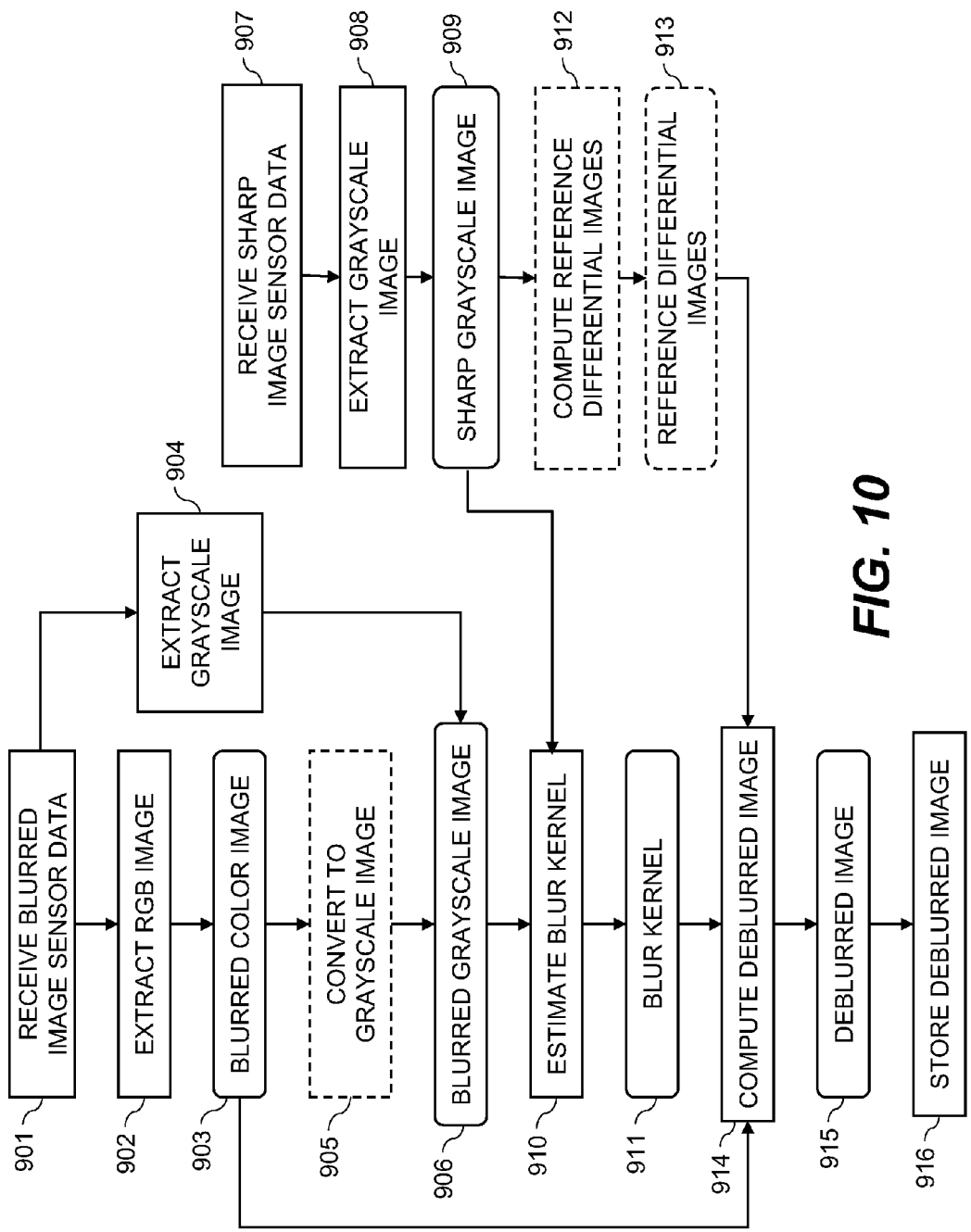
FIG. 10 is a flowchart for a preferred embodiment of the present invention using an image captured with an image sensor having color and panchromatic pixels.

The method described with reference to FIG. 2 can be modified somewhat to take advantage of the unique attributes of images captured with image sensors having panchromatic pixels and color pixels. FIG. 10 shows a flowchart of a preferred embodiment of the present invention that is appropriate to use for blurred and sharp image captured with these types of image sensors.

Receive blurred image sensor data step 901 receives blurred image sensor data captured with an image sensor having panchromatic pixels and color pixels, the pixels being arranged in a rectangular minimal repeating unit. In a preferred embodiment of the present invention, the image sensor will have color pixels with at least three different color responses. Similarly, receive sharp image sensor data step 907 receives sharp image sensor data captured with the image sensor. The sharp image sensor data is captured with a short exposure time. The blurred image sensor data is captured with a longer exposure time and will therefore have a higher level of motion blur and a lower level of image noise than the sharp image sensor data.

An extract RGB image step 902 is used to extract a blurred color image 903 from the blurred image sensor data. In a preferred embodiment of the present invention, the extract RGB image step 902 uses the method shown in FIG. 8. An extract grayscale image step 904 is used to extract the panchromatic pixels from the blurred image sensor data to form a blurred grayscale image 906. The extract grayscale image step 904 includes interpolating panchromatic pixel values for the pixel positions corresponding to the color pixels in the color filter array. Alternately, the blurred grayscale image 906 can be determined from the blurred color image 903 using a convert to grayscale image step 905. This can be accomplished using any method known in the art, such as using the relationship given earlier in Eq. (1).

Extract grayscale image step 908 is used to extract the panchromatic pixels from the sharp image sensor data to form a sharp grayscale image 909. The extract grayscale image step 908 includes interpolating panchromatic pixel values for the pixel positions corresponding to the color pixels in the color filter array.

An estimate blur kernel step 910 is used to determine a blur kernel 911 responsive to the blurred grayscale image 906 and the sharp grayscale image 909. The details of the estimate blur kernel step 910 were described earlier with reference to the estimate blur kernel step 220 in FIG. 2.

Next, a compute deblurred image step 914 is used to determine a deblurred image 915 responsive to the blurred color image 903 and the blur kernel 911. Optionally, the compute deblurred image step 914 can also use a set of one or more reference differential images 913 determined from the sharp grayscale image 909 using compute reference differential images step 912. The details of the compute reference differential images step 912 were discussed earlier with reference to the compute reference differential images step 230 in FIG. 2. If the compute deblurred image step 914 uses the reference differential images 913, the details of the method for determining the deblurred image 915 will be the same as those described above with reference to the compute deblurred image step 245 in FIG. 2.

For the case where the compute deblurred image step 914 does not use any reference differential images 913, the deblurred image can still be determined using a Bayesian inference method with MAP estimation as described with reference to FIG. 2. The only difference being that the energy function would not include the image differential term, which is the third term in Eq. 4. In this case, the following energy function can be used:

$$E(L) = (L \otimes K - B)^2 + \lambda_1 w |\nabla L|^2 \quad (8)$$

where L is the deblurred image 915, K is the blur kernel 911, B is the blurred color image 903, $\otimes$ is the convolution operator, $|\cdot|$ the absolute value operator, $\nabla$ is the gradient operator, w is a pixel-dependent weighting factor, and $\lambda_1$ is a weighting coefficient.

Finally, a store deblurred image step 916 is used to store the resulting deblurred image 915 in a processor-accessible memory. The processor-accessible memory can be any type of digital storage such as RAM or a hard disk.

Figure 11:
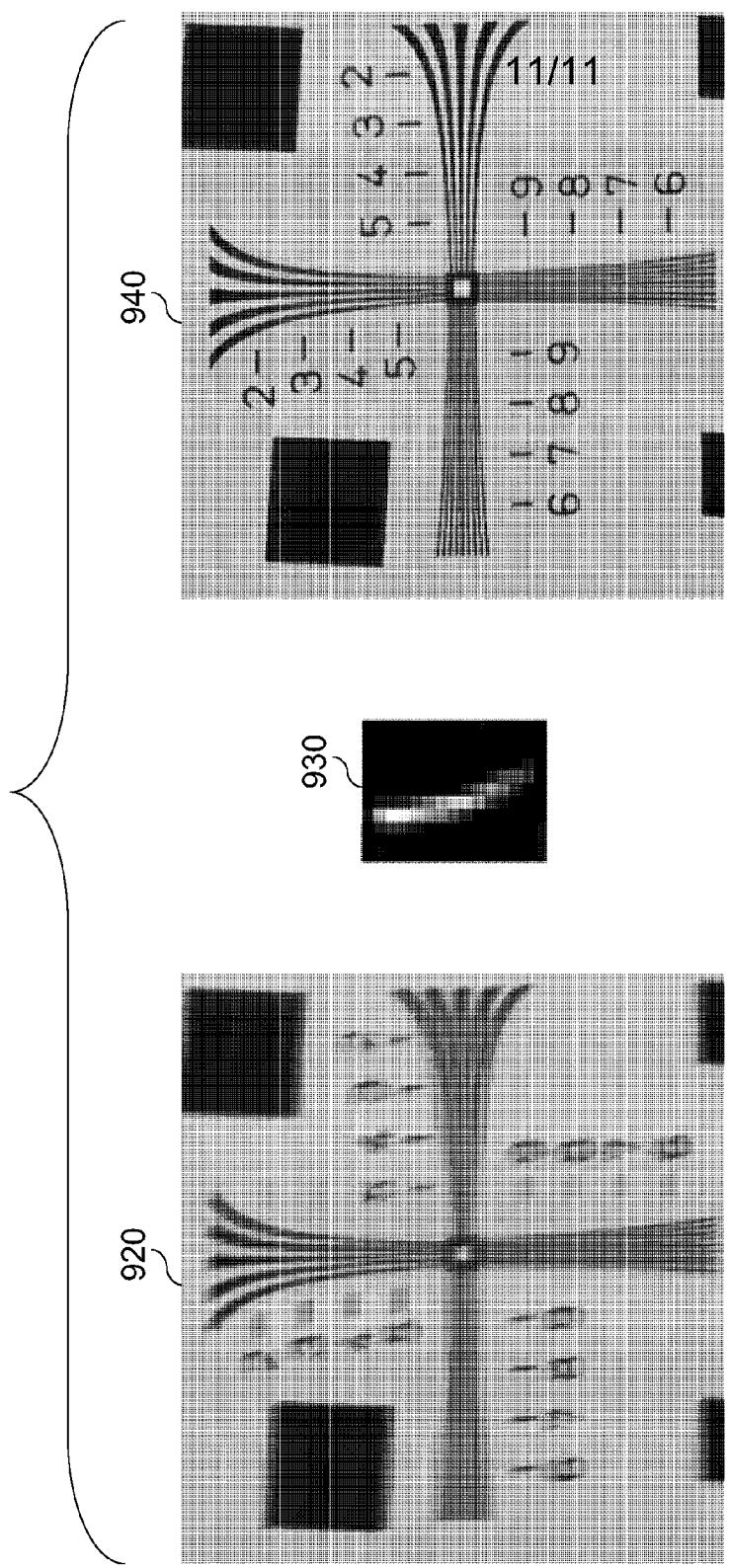
FIG. 11 shows an example deblurred image formed according to the method of the present invention.

FIG. 11 shows an example of a blurred image 920. The method shown in FIG. 10 was used to determine a blur kernel 930 and a resulting deblurred image 940. It can be seen from the blur kernel 930 that the camera was moved relative to the scene during the image capture time in a largely vertical motion. As a result, horizontal image structure in the blurred image 920 is blurred more strongly than vertical image structure. The deblurred image 940 has compensated for the blurring and has restored approximately equal sharpness levels for both the horizontal and vertical image structures.

The method of the present invention can be applied to any type of digital imaging system. In a preferred embodiment of the present invention, the method is implemented as part of a digital still camera system. The method may be implemented by a processor in the digital still camera, or alternately may be implemented wholly or in part by a processor external to the digital still camera, such as a personal computer. The method of the present invention can also be used to process digital video images. In this case, frames of the digital video can be captured with alternating short and long exposure times, and pairs of video frames can be processed to form deblurred images.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST

110 Data processing system
120 Peripheral system
130 User interface system
140 Data storage system
200 Receive blurred image step
205 Blurred image
210 Receive sharp image step
215 Sharp image
220 Estimate blur kernel step
225 Blur kernel
230 Compute reference differential images step
235 Reference differential images
245 Compute deblurred image step
250 Deblurred image
255 Store deblurred image step
270 Short exposure time
280 Longer exposure time
400 Pre-process images step
405 Blurred grayscale image
410 Sharp grayscale image
415 Initialize blur kernel step
420 Down-sample images step
425 Update blur kernel step
430 Threshold blur kernel step
435 Normalize blur kernel step
440 Test
445 Up-sample blur kernel step
450 Output blur kernel step
500 Array of indices
510 Current pixel location
600 Color filter array pattern
610 Panchromatic pixels
620 Red pixels
630 Green pixels
640 Blue pixels
650 Minimal repeating unit
700 Color filter array pattern
705 Color filter array pattern
710 Color filter array pattern
715 Color filter array pattern
720 Color filter array pattern
725 Color filter array pattern
730 Color filter array pattern
735 Color filter array pattern
790 Image sensor
800 Color filter array image
802 Interpolate panchromatic image block
804 Interpolated panchromatic image
806 Generate interpolated color image block
808 Generate color differences block
810 Color difference values
812 Interpolate color difference image block
814 Interpolated color difference image
816 Full-color output image
818 Fuse images block
820 Interpolated color image
830 Short panchromatic pixel exposure time
840 Longer panchromatic pixel exposure time
850 Color pixel exposure time
901 Receive blurred image sensor data step
902 Extract RGB image step
903 Blurred color image 904 Extract grayscale image step
905 Convert to grayscale image step
906 Blurred grayscale image
907 Receive sharp image sensor data step
908 Extract grayscale image
909 Sharp grayscale image
910 Estimate blur kernel step
911 Blur kernel
912 Compute reference differential images step
913 Reference differential images
914 Compute deblurred image step
915 Deblurred image
916 Store deblurred image step
920 Blurred image
930 Blur kernel
940 Deblurred image

The invention claimed is:

1. A method for determining a deblurred image from images captured using an image sensor comprising a two-dimensional array of light-sensitive pixels including panchromatic pixels and color pixels, the pixels being arranged in a rectangular minimal repeating unit, the method implemented at least in part by a data processing system and comprising:
   a) receiving image sensor data from the image sensor for a sharp image of a scene captured with a short exposure time;
   b) receiving image sensor data from the image sensor for a blurred image of the scene captured with a longer exposure time than the sharp image, wherein the blurred image has a higher level of motion blur than the sharp image;
   c) determining an interpolated sharp grayscale image from the image sensor data for the sharp image;
   d) determining an interpolated blurred color image from the image sensor data for the blurred image;
   e) determining an interpolated blurred grayscale image from the image sensor data for the blurred image;
   f) determining a blur kernel responsive to the sharp grayscale image and the blurred grayscale image;
   g) determining a deblurred image responsive to the blurred color image and the blur kernel; and
   h) storing the deblurred image in a processor-accessible memory system.

2. The method of claim 1 wherein the blur kernel is determined by using an optimization method to minimize an energy function which includes a term that is a function of a difference between the blurred grayscale image and a candidate blurred image determined by convolving the sharp grayscale image with a candidate blur kernel.

3. The method of claim 2 wherein the blur kernel is determined by analyzing only a subset of the image pixels in the sharp grayscale image and a corresponding subset of the image pixels in the blurred grayscale image, wherein the subsets are determined to contain significant image detail.

4. The method of claim 3 wherein the subset of the image pixels in the sharp grayscale image is selected by:
   determining a Laplacian image from either the sharp grayscale image or the blurred grayscale image or both; and
   selecting the subset of image pixels in the sharp grayscale image and the corresponding subset of image pixels in the blurred grayscale image by analyzing the Laplacian image to determine a subset of image pixels containing significant image detail.

5. The method of claim 2, wherein a denoising algorithm or a tone scale adjustment algorithm or both are applied to the sharp grayscale image before it is used to determine the blur kernel.

6. The method of claim 2, wherein the blur kernel is determined by analyzing multiple resized versions of the sharp grayscale image and the blurred grayscale image having different resolutions.

7. The method of claim 1 wherein the deblurred image is determined using a Bayesian inference method.

8. The method of claim 7 wherein the Bayesian inference method includes evaluating candidate deblurred images using an energy function.

9. The method of claim 8 wherein the energy function includes an image fidelity term which is a function of the difference between the blurred color image and a candidate blurred image determined by convolving a candidate deblurred image with the blur kernel.

10. The method of claim 9 wherein the energy function further includes an image differential term which is a function of differences between one or more reference differential images determined from the interpolated sharp grayscale image and one or more candidate differential images determined from the candidate deblurred image.

11. The method of claim 9 wherein the energy function further includes a term which is a function of a gradient of the candidate deblurred image.

12. The method of claim 8 wherein the energy function is optimized using a conjugate gradient method.

13. The method of claim 1 wherein the deblurred image is determined using a frequency domain deconvolution method.

14. The method of claim 1 wherein the blurred grayscale image is determined from the blurred color image.

15. The method of claim 1 further including determining one or more reference differential images responsive to the sharp grayscale image; and wherein the step of determining the deblurred image is further responsive to the one or more reference differential images.

16. The method of claim 15 wherein the one or more reference differential images include a horizontal differential image representing differences between neighboring pixels in the horizontal direction and a vertical differential image representing differences between neighboring pixels in the vertical direction.

17. The method of claim 1 further including applying an affine transform to the sharp grayscale image or the blurred grayscale image to better align the sharp grayscale image with the blurred grayscale image.

18. The method of claim 1 wherein the sharp image and the blurred image are captured sequentially using a digital camera in response to a single button press.

19. The method of claim 1 wherein the motion blur is at least partially due to motion of the digital camera during the time that the sharp image and the blurred image are captured.

20. The method of claim 1 wherein the motion blur is at least partially due to motion of objects in the scene during the time that the sharp image and the blurred image are captured.

21. The method of claim 1 wherein the blurred image has a lower level of image noise than the sharp image.

22. The method of claim 1 wherein the sharp image and the blurred image are frames of a digital video.

23. A digital camera system comprising:
   an image sensor for capturing an image of a scene, the image sensor comprising a two-dimensional array of light-sensitive pixels including panchromatic pixels and color pixels, the pixels being arranged in a rectangular minimal repeating unit;

a lens system for imaging the scene onto the image sensor;
a processor-accessible memory system.
a data processing system for performing the steps of:
- receiving image sensor data from the image sensor for a sharp image of a scene captured with a short exposure time;
- receiving image sensor data from the image sensor for a blurred image of the scene captured with a longer exposure time than the sharp image, wherein the blurred image has a higher level of motion blur than the sharp image;
- determining an interpolated sharp grayscale image from the image sensor data for the sharp image;
- determining an interpolated blurred color image from the image sensor data for the blurred image;
- determining an interpolated blurred grayscale image from the image sensor data for the blurred image;
- determining a blur kernel responsive to the sharp grayscale image and the blurred grayscale image;
- determining a deblurred image responsive to the blurred color image and the blur kernel; and
- storing the deblurred image in the processor-accessible memory system.

24. A computer program product for determining a deblurred image from images captured using an image sensor comprising a two-dimensional array of light-sensitive pixels including panchromatic pixels and color pixels, the pixels being arranged in a rectangular minimal repeating unit, the computer program product comprising a non-transitory tangible computer readable storage medium storing an executable software application for causing a data processing system to perform the steps of:

a) receiving image sensor data from the image sensor for a sharp image of a scene captured with a short exposure time;
b) receiving image sensor data from the image sensor for a blurred image of the scene captured with a longer exposure time than the sharp image, wherein the blurred image has a higher level of motion blur than the sharp image;
c) determining an interpolated sharp grayscale image from the image sensor data for the sharp image;
d) determining an interpolated blurred color image from the image sensor data for the blurred image;
e) determining an interpolated blurred grayscale image from the image sensor data for the blurred image;
f) determining a blur kernel responsive to the sharp grayscale image and the blurred grayscale image;
g) determining a deblurred image responsive to the blurred color image and the blur kernel; and
h) storing the deblurred image in a processor-accessible memory system.

* * * * *